(12) United States Patent
Kariatsumari (10) Patent No.: US 8,773,057 B2
(45) Date of Patent: Jul. 8, 2014

(54) MOTOR CONTROL UNIT AND ELECTRIC POWER STEERING SYSTEM

(75) Inventor: Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 211 days.

(21) Appl. No.: 13/551,106

(22) Filed: Jul. 17, 2012

(65) Prior Publication Data

US 2013/0033216 A1 Feb. 7, 2013

(30) Foreign Application Priority Data

Aug. 2, 2011 (JP) .................................. 2011-169369

(51) Int. Cl.
*H02P 7/00* (2006.01)

(52) U.S. Cl.
USPC ........... 318/436; 318/432; 318/434; 318/456; 318/453; 701/41

(58) Field of Classification Search
USPC ............. 318/432, 434, 456, 453, 254; 701/41
See application file for complete search history.

(56) References Cited

U.S. PATENT DOCUMENTS

| | | | |
|---|---|---|---|
| 6,246,197 B1 * | 6/2001 | Kurishige et al. | 318/432 |
| 7,512,468 B2 * | 3/2009 | Tamaizumi et al. | 701/41 |
| 7,548,035 B2 * | 6/2009 | Endo et al. | 318/432 |
| 7,574,294 B2 * | 8/2009 | Ta et al. | 701/41 |
| 7,929,268 B2 * | 4/2011 | Morishita | 361/144 |
| 8,154,231 B2 * | 4/2012 | Komatsu et al. | 318/400.06 |
| 8,651,227 B2 * | 2/2014 | Taniguchi et al. | 180/446 |
| 2009/0079375 A1 * | 3/2009 | Suzuki | 318/434 |
| 2009/0179062 A1 * | 7/2009 | Shima et al. | 227/2 |
| 2010/0235051 A1 * | 9/2010 | Kariatsumari et al. | 701/41 |
| 2011/0001441 A1 * | 1/2011 | Kariatsumari et al. | 318/3 |
| 2011/0118940 A1 * | 5/2011 | Kariatsumari et al. | 701/42 |
| 2011/0231066 A1 * | 9/2011 | Ohno et al. | 701/42 |
| 2012/0205186 A1 * | 8/2012 | Niimi et al. | 180/446 |
| 2014/0062353 A1 * | 3/2014 | Oyobe et al. | 318/400.02 |

FOREIGN PATENT DOCUMENTS

JP  A-2010-029029  2/2010

* cited by examiner

*Primary Examiner* — Eduardo Colon Santana
*Assistant Examiner* — Bickey Dhakal
(74) *Attorney, Agent, or Firm* — Oliff PLC (57) ABSTRACT

An ECU that controls a motor includes: a target current value setting unit setting a target current; a voltage detecting unit detecting a detected voltage on the basis of a detection signal from a voltage sensor; a voltage calculation unit calculating an estimated voltage on the basis of a power supply voltage of a battery; and an induced voltage observer calculating an induced voltage generated at the motor using an inter-terminal voltage based on the estimated voltage when the target current is set to a value other than zero; whereas the induced voltage observer calculates the induced voltage using an inter-terminal voltage based on the detected voltage when the target current is set to zero.

4 Claims, 5 Drawing Sheets

MOTOR CONTROL UNIT AND ELECTRIC POWER STEERING SYSTEM

INCORPORATION BY REFERENCE/RELATED APPLICATION

This application claims priority to Japanese Patent Application No. 2011-169369 filed on Aug. 2, 2011 the disclosure of which, including the specification, drawings and abstract, is incorporated herein by reference in its entirety.

BACKGROUND OF THE INVENTION

1. Field of the Invention

The invention relates to a motor control unit that controls a brushed motor, and an electric power steering system that includes the motor control unit.

2. Discussion of Background

In recent years, development of an electric power steering system that includes a motor but does not include a sensor, such as a resolver, for detecting a rotational speed of the motor has been proceeding. Japanese Patent Application Publication No. 2010-029029 (JP 2010-029029 A) describes a method of estimating a rotational speed of a motor in an electric power steering system. In the method, an induced voltage generated with the rotation of a rotor that constitutes the motor is estimated, and a rotational speed of the motor is calculated on the basis of the estimated induced voltage.

JP 2010-029029 A describes a motor control unit that calculates an induced voltage generated at the brushless motor. The motor control unit includes a disturbance observer (induced voltage calculation means) that calculates an induced voltage as a disturbance. When a voltage value corresponding to a voltage across terminals (hereinafter, referred to as "inter-terminal voltage") of the motor and a value of current flowing through the motor are input into the disturbance observer, an induced voltage is calculated on the basis of the received values.

Note that, in a brushed motor as well as in a brushless motor, it is possible to calculate an induced voltage with the use of a disturbance observer.

There are two methods of acquiring a voltage value input into a disturbance observer. The first method is to detect an inter-terminal voltage of a motor (hereinafter, also referred to as "detected voltage value") as a detected voltage value with the use of a known sensor (voltmeter). The second method is to calculate an estimated value of an inter-terminal voltage of a motor (hereinafter, also referred to as "estimated voltage value") by multiplying a voltage of a battery that serves as a power supply source for the motor (i.e., battery voltage) by a duty ratio of a drive signal input into the motor. The estimated voltage value is higher in resolution than the detected voltage value. Therefore, the accuracy of an induced voltage calculated with the use of the estimated voltage value is higher than the accuracy of an induced voltage calculated with the use of the detected voltage value.

However, when an induced voltage generated at a brushed motor is calculated, the following inconvenience occurs if an estimated voltage value is used. That is, when a target current value for the brushed motor is zero, a duty ratio of a drive signal input into the motor is set to zero. Therefore, it is not possible to calculate an estimated voltage value. Accordingly, when an induced voltage generated at the brushed motor is calculated, a detected voltage value is generally used. In this case, although it is possible to calculate an induced voltage irrespective of the magnitude of a target current value, the accuracy of a calculated induced voltage is lower than that when an estimated voltage value is used.

SUMMARY OF THE INVENTION

The invention provides a motor control unit and an electric power steering system that are able to calculate an induced voltage generated at a brushed motor irrespective of the magnitude of a target current value for the motor and that are able to improve the accuracy of calculation of the induced voltage.

According to a feature of an example of the invention, in a motor control unit, when a target value of current that is passed through a motor is zero, an induced voltage generated at the motor is calculated with the use of a voltage value based on a detected voltage value; whereas, when the target value of current is not zero, the induced voltage generated at the motor is calculated with the use of a voltage value based on an estimated voltage value that is higher in resolution than the detected voltage value. Thus, it is possible to calculate the induced voltage generated at the motor irrespective of the magnitude of the target value of current, and it is possible to improve the accuracy of calculation of the induced voltage.

According to another feature of an example of the invention, when the target value of current is changed from zero to a value other than zero, a voltage value that is input into induced voltage calculation means is adjusted so as to be brought from the detected voltage value detected before the target value of current is changed, closer to the estimated voltage value calculated after the target value of current is changed. On the other hand, when the target value of current is changed from a value other than zero to zero, the voltage value that is input into the induced voltage calculation means is adjusted so as to be brought from the estimated voltage value calculated before the target value of current is changed, closer to the detected voltage value detected after the target value of current is changed. As a result, it is possible to suppress an abrupt change in the calculated induced voltage due to a change in the target value of current. Consequently, it is possible to suppress an unnatural change in the controlled variable in motor control based on the calculated induced voltage.

According to a further feature of an example of the invention, when the target value of current is changed from zero to a value other than zero, the voltage value that is input into the induced voltage calculation means is gradually brought from the detected voltage value detected before the target value of current is changed, closer to the estimated voltage value calculated after the target value of current is changed, and becomes the estimated voltage value after a lapse of an adjustment time from the time when the target value of current is changed. On the other hand, when the target value of current is changed from a value other than zero to zero, the voltage value that is input into the induced voltage calculation means is gradually brought from the estimated voltage value calculated before the target value of current is changed, closer to the detected voltage value detected after the target value of current is changed, and becomes the detected voltage value after a lapse of the adjustment time from the time when the target value of current is changed. Thus, it is possible to suppress an abrupt change in the induced voltage due to a change in the target value of current.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Figure 1:
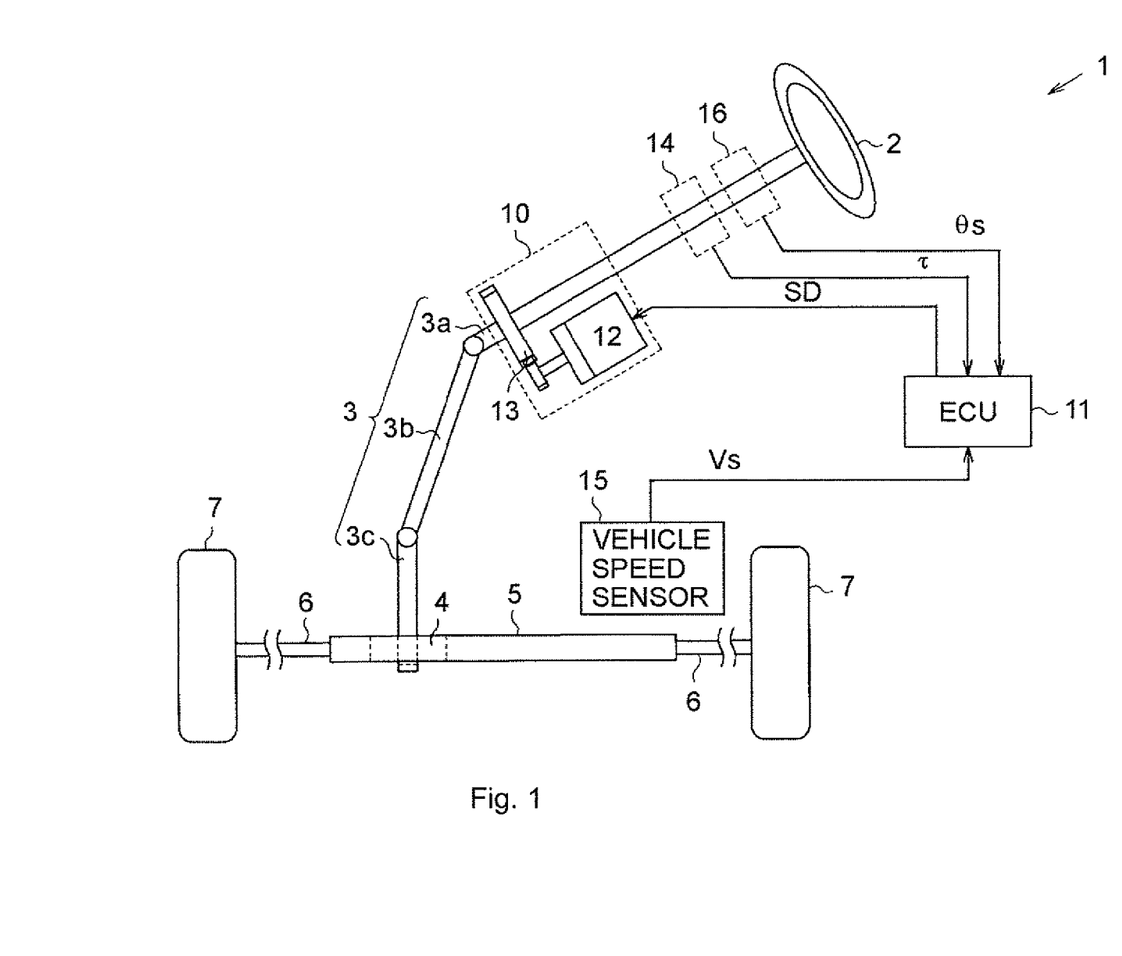
FIG. 1 is a schematic configuration view that shows an electric power steering system that includes a motor control unit according to an embodiment of the invention.

Hereinafter, an example embodiment of the invention will be described with reference to FIG. 1 to FIG. 6. As shown in FIG. 1, an electric power steering system 1 according to the present embodiment includes a steering shaft 3 to which a steering wheel 2 is fixed. The steering shaft 3 is coupled to a rack shaft 5 via a rack-and-pinion mechanism 4. The rotation of the steering shaft 3 resulting from an operation of the steering wheel 2 is converted into a reciprocal linear motion of the rack shaft 5 by the rack-and-pinion mechanism 4. The steering shaft 3 according to the present embodiment is formed by coupling a column shaft 3a, an intermediate shaft 3b and a pinion shaft 3c to each other. The reciprocal linear motion of the rack shaft 5 resulting from the rotation of the steering shaft 3 is transmitted to knuckles (not shown) via tie rods 6 coupled to respective ends of the rack shaft 5. Thus, the steered angle of steered wheels 7 is changed.

In addition, the electric power steering system 1 includes an actuator 10 and an ECU 11. The actuator 10 applies assist force for assisting a steering operation to a steering system. The ECU 11 that may function as a motor control unit and that controls the operation of the actuator 10.

The actuator 10 is a so-called column-type actuator in which a brushed motor 12 is drivably coupled to the column shaft 3a via a speed reduction mechanism 13. The thus configured actuator 10 reduces the speed of rotation of the motor 12 using the speed reduction mechanism 13 and then transmits the rotation with the reduced speed to the column shaft 3a, thereby applying assist force based on the motor torque to the steering system.

A torque sensor 14, a vehicle speed sensor 15 and a steering sensor 16 are electrically connected to the ECU 11. The torque sensor 14 detects a steering torque τ transmitted to the steering shaft 3. The vehicle speed sensor 15 detects a vehicle speed Vs. The steering sensor 16 detects a steering angle θs of the steering wheel 2. The ECU 11 computes a target assist force that is applied to the steering system on the basis of the above information, and outputs a drive signal SD to the motor 12 such that the motor 12 generates a motor torque corresponding to the target assist force. In this way, the ECU 11 controls assist force that is applied to the steering system.

Figure 2:
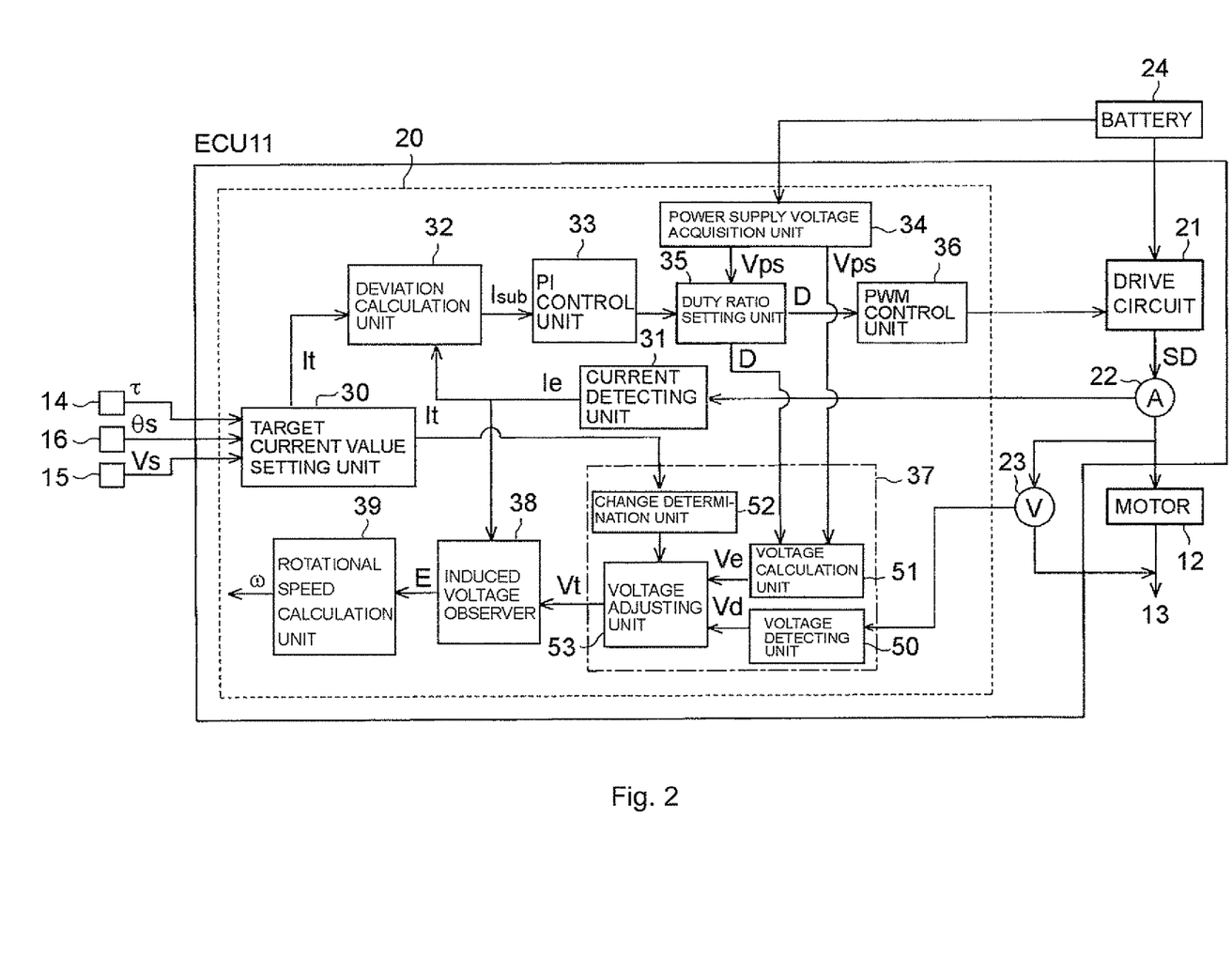
FIG. 2 is a block diagram that shows the electrical configuration of the electric power steering system according to the embodiment.

Next, the ECU 11 according to the present embodiment will be described with reference to FIG. 2. The ECU 11 includes a microcomputer 20 and a drive circuit 21. The microcomputer 20 is formed of, for example, a CPU, a ROM, a RAM, and a nonvolatile memory (not shown). The drive circuit 21 is used to drive the motor 12. In addition to the torque sensor 14, the vehicle speed sensor 15 and the steering sensor 16, a current sensor 22 and a voltage sensor 23 are electrically connected to the microcomputer 20. The current sensor 22 is used to detect a current flowing through the motor 12. The voltage sensor 23 is used to detect an inter-terminal voltage of the motor 12.

The drive circuit 21 has various electronic components (not shown), such as switching elements (for example, FETs). A power supply voltage Vps is applied from a battery 24 that is a power supply source of a vehicle to the drive circuit 21. The drive circuit 21 generates a drive signal SD having a duty ratio based on a control command from the microcomputer 20, and outputs the drive signal SD to the motor 12.

The microcomputer 20 includes a target current value setting unit 30, a current detecting unit 31, a deviation calculation unit 32, a PI control unit 33, a power supply voltage acquisition unit 34, a duty ratio setting unit 35, a PWM control unit 36, an input voltage setting unit 37, an induced voltage observer 38, and a rotational speed calculation unit 39. These functional units 30 to 39 may be formed of either hardware or software.

The target current value setting unit 30 sets a target current value It that is a target value of current that is passed through the motor 12 on the basis of a steering torque τ detected by the torque sensor 14 and a vehicle speed Vs detected by the vehicle speed sensor 15. For example, the target current value It is set to a larger value as the steering torque τ increases, and is set to a larger value as the vehicle speed Vs decreases. Then, the target current value setting unit 30 outputs the set target current value It to the deviation calculation unit 32 and the input voltage setting unit 37. Therefore, in the present embodiment, the target current value setting unit 30 may function as target value setting means.

The current detecting unit 31 detects a detected current value Ie that is a current flowing through the motor 12 on the basis of a detection signal output from the current sensor 22, and then outputs the detected current value Ie to the deviation calculation unit 32 and the induced voltage observer 38. The deviation calculation unit 32 calculates a deviation Isub between the received target current value It and detected current value Ie, and then outputs the deviation Isub to the PI control unit 33. The PI control unit 33 executes PI operation based on the received deviation Isub, to calculate a controlled variable of the motor 12. Then, the PI control unit 33 outputs the controlled variable to the duty ratio setting unit 35.

The power supply voltage acquisition unit 34 acquires a power supply voltage Vps that is a value of voltage that is allowed to be applied from the battery 24 to the drive circuit 21, and then outputs the power supply voltage Vps to the duty ratio setting unit 35 and the received voltage setting unit 37. The duty ratio setting unit 35 sets a duty ratio D of the drive signal SD that is output to the motor 12 on the basis of the received controlled variable and power supply voltage Vps, and then outputs the duty ratio D to the PWM control unit 36 and the input voltage setting unit 37. The PWM control unit 36 controls the drive circuit 21 on the basis of the received duty ratio D. Then, the drive circuit 21 generates the drive signal SD corresponding to the received control command, and then outputs the drive signal SD to the motor 12.

The input voltage setting unit 37 includes a voltage detecting unit 50 that may function as voltage detecting means, a voltage calculation unit 51 that may function as voltage calculation means, a change determination unit 52, and a voltage adjusting unit 53 that may function as voltage adjusting means. The voltage detecting unit 50 detects a detected voltage value Vd that is a detected value of an inter-terminal voltage on the basis of a detection signal output from the voltage sensor 23, and then outputs the detected voltage value Vd to the voltage adjusting unit 53.

The voltage calculation unit 51 calculates an estimated voltage value Ve that is an estimated value of an inter-terminal voltage on the basis of the duty ratio D received from the duty ratio setting unit 35 and the power supply voltage Vps received from the power supply voltage acquisition unit 34. Specifically, the voltage calculation unit 51 multiplies the power supply voltage Vps by the duty ratio D, and then sets the result of multiplication as the estimated voltage value Ve. Then, the voltage calculation unit 51 outputs the estimated voltage value Ve to the voltage adjusting unit 53.

The target current value It is input into the change determination unit 52 from the target current value setting unit 30. Then, the change determination unit 52 determines whether the target current value It is changed from a value other than zero to zero, and determines whether the target current value It is changed from zero to a value other than zero. Then, the change determination unit 52 outputs the result of determination to the voltage adjusting unit 53. Note that, in the present embodiment, the fact that the target current value It is changed from a value other than zero to zero and the fact that the target current value It is changed from zero to a value other than zero are each expressed as "an affirmative change determination is made".

The voltage adjusting unit 53 outputs an inter-terminal voltage Vt, based on the information received from the change determination unit 52, to the induced voltage observer 38. That is, the voltage adjusting unit 53 outputs the detected voltage value Vd as the inter-terminal voltage Vt when the target current value It is kept at zero, and outputs the estimated voltage value Ve as the inter-terminal voltage Vt when the target current value It is kept at a value other than zero. Note that the situation where "the target current value It is kept at a value other than zero" includes not only the case where the target current value It is kept at a constant value other than zero but also the case where the target current value It is changed form a value other than zero to another value other than zero.

In addition, when an affirmative change determination is made, the voltage adjusting unit 53 adjusts the voltage value such that the voltage value is gradually brought from one of the detected voltage value Vd and the estimated voltage value Ve closer to the other one of these values. Then, the voltage adjusting unit 53 outputs the adjusted voltage value as the inter-terminal voltage Vt.

Figure 3:
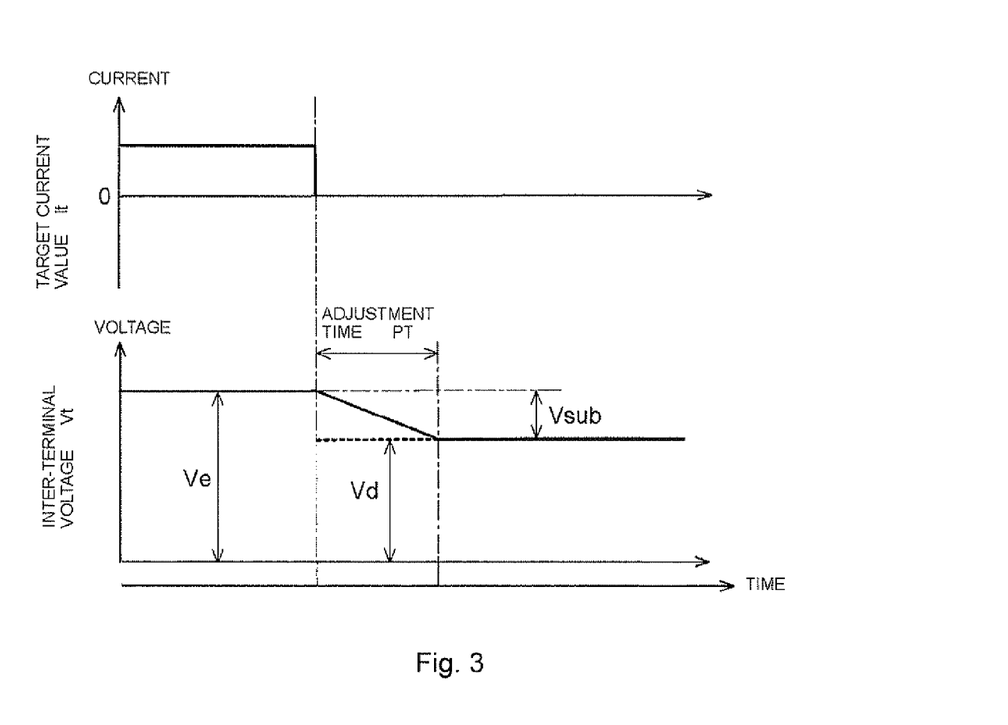
FIG. 3 is a timing chart that shows a manner in which an inter-terminal voltage used to calculate an induced voltage changes when a target current value is changed from a value other than zero to zero.

FIG. 3 shows a change in the inter-terminal voltage Vt in the case where the target current value It is changed from a value other than zero to zero as an example of a case where an affirmative change determination is made. That is, as shown in FIG. 3, when the target current value It is changed from a value other than zero to zero, the voltage adjusting unit 53 calculates a difference Vsub between the estimated voltage value Ve calculated before an affirmative change determination is made and the detected voltage value Vd detected at the time when an affirmative change determination is made. In addition, the voltage adjusting unit 53 sets an adjustment time PT such that the larger the calculated difference Vsub is, the longer the adjustment time PT is. Then, the voltage adjusting unit 53 adjusts the inter-terminal voltage Vt during the set adjustment time PT such that the inter-terminal voltage Vt is gradually brought from the estimated voltage value Ve calculated before an affirmative change determination is made, closer to the detected voltage value Vd detected after an affirmative change determination is made. Note that, in the present embodiment, an amount of change in the inter-terminal voltage Vt per unit time in the case where an affirmative change determination is made is constant irrespective of the magnitude of the difference Vsub.

On the other hand, when the target current value It is changed from zero to a value other than zero, the voltage adjusting unit 53 calculates the difference Vsub between the detected voltage value Vd detected before an affirmative change determination is made and the estimated voltage value Ve calculated at the time when an affirmative change determination is made. In addition, the voltage adjusting unit 53 sets the adjustment time PT such that the larger the calculated difference Vsub is, the longer the adjustment time PT is. Then, the voltage adjusting unit 53 adjusts the inter-terminal voltage Vt during the set adjustment time PT such that the inter-terminal voltage Vt is gradually brought from the detected voltage value Vd detected before an affirmative change determination is made, closer to the estimated voltage value Ve calculated after an affirmative change determination is made.

The induced voltage observer 38 is a disturbance observer that calculates an induced voltage E generated at the motor 12 as a disturbance. The thus configured induced voltage observer 38 calculates the induced voltage E generated at the motor 12 on the basis of the inter-terminal voltage Vt received from the input voltage setting unit 37 and the detected current value Ie received from the current detecting unit 31. Thus, in the present embodiment, the induced voltage observer 38 may function as induced voltage calculation means. Note that the concrete configuration of the induced voltage observer 38 will be described later.

The rotational speed calculation unit 39 calculates a rotational speed ω of the motor 12 using the received induced voltage E. For example, the rotational speed ω is calculated according to Equation 1 indicated below. Thus, in the present embodiment, the rotational speed calculation unit 39 may function as rotational speed calculation means.

$$\omega = E/Ke \qquad \text{Equation 1}$$

Here, Ke is a reverse voltage constant.

Figure 4:
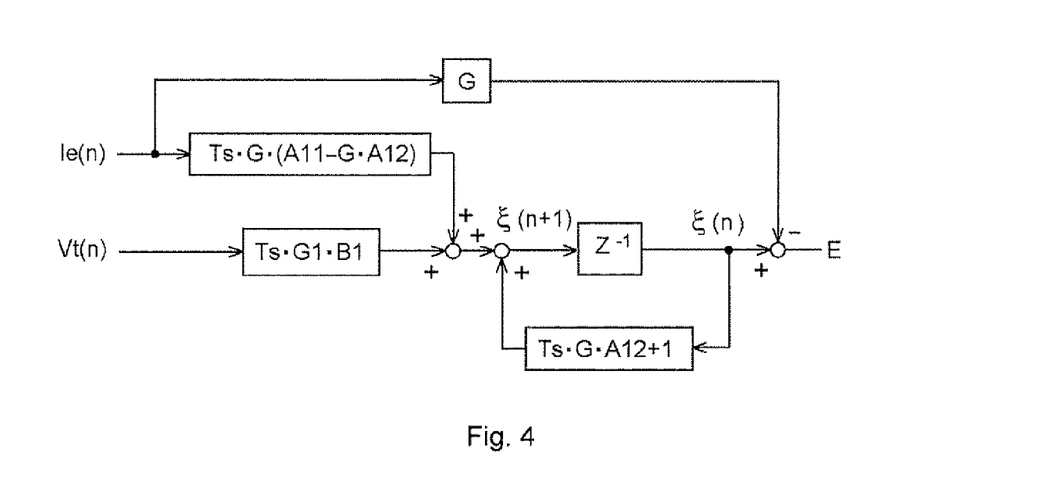
FIG. 4 is a block diagram that shows the schematic configuration of an induced voltage observer according to the embodiment.

Next, the induced voltage observer 38 will be described with reference to FIG. 4. As shown in FIG. 4, the induced voltage observer 38 is expressed by Equations 2 to 6 indicated below.

$$\xi(n+1) = (Ts \cdot G \cdot A_{12} + 1) \cdot \xi(n) + Ts \cdot G_1 \cdot B_1 \cdot Vt(n) + Ts \cdot G \cdot (A_{11} - G \cdot A_{12}) \cdot Ie(n) \qquad \text{Equation 2}$$

$$E = \xi(n) - G \cdot Ie(n) \qquad \text{Equation 3}$$

$$A_{11} = -R/L \qquad \text{Equation 4}$$

$$A_{12} = -1/L \qquad \text{Equation 5}$$

$$B_1 = 1/L \qquad \text{Equation 6}$$

Here, Ts is a computation cycle, G is an observer gain, ξ is a variable that indicates an internal state, n is a number of computation cycle, R is a resistance value of the motor, and L is an inductance of the motor.

Figure 5:
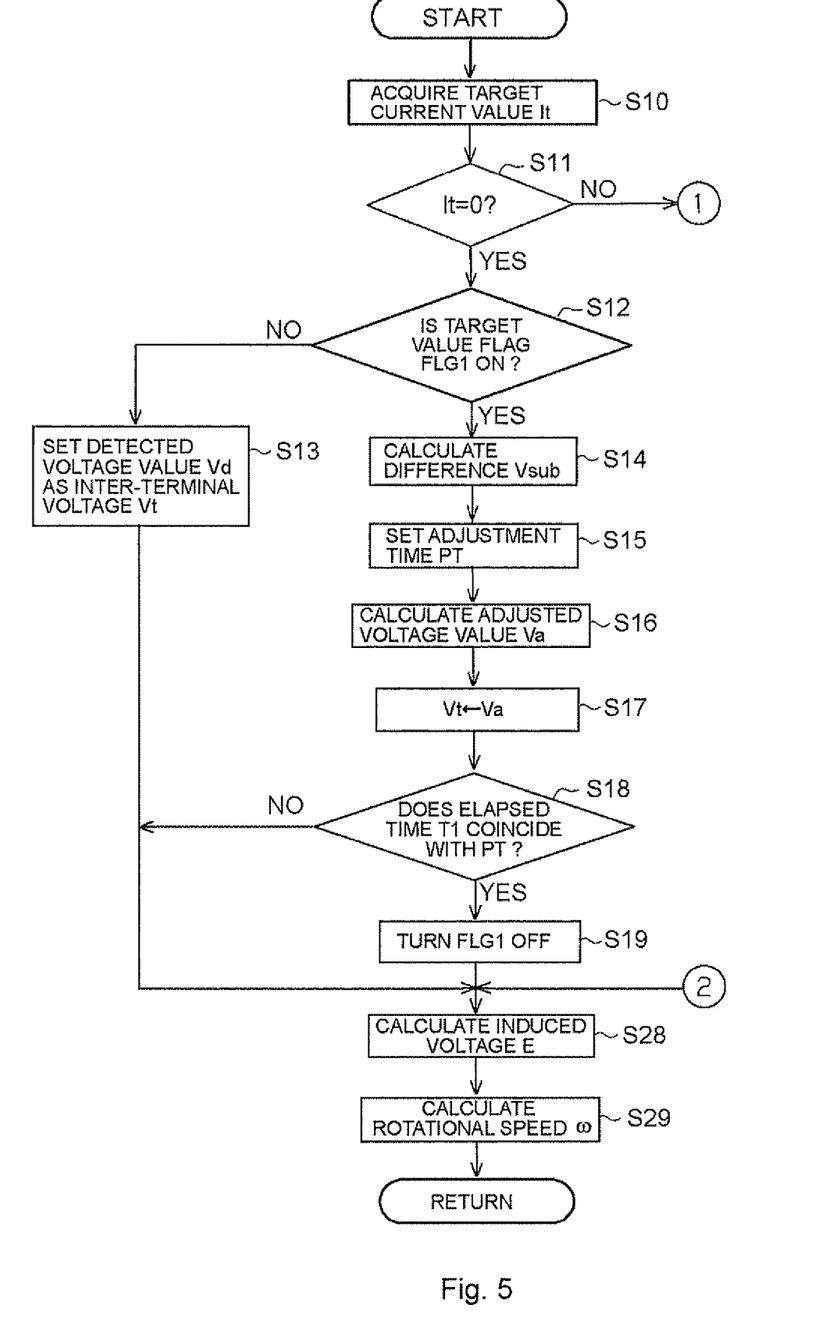
FIG. 5 and FIG. 6 are flowcharts that illustrate a rotational speed acquisition process routine according to the embodiment.
Figure 6:
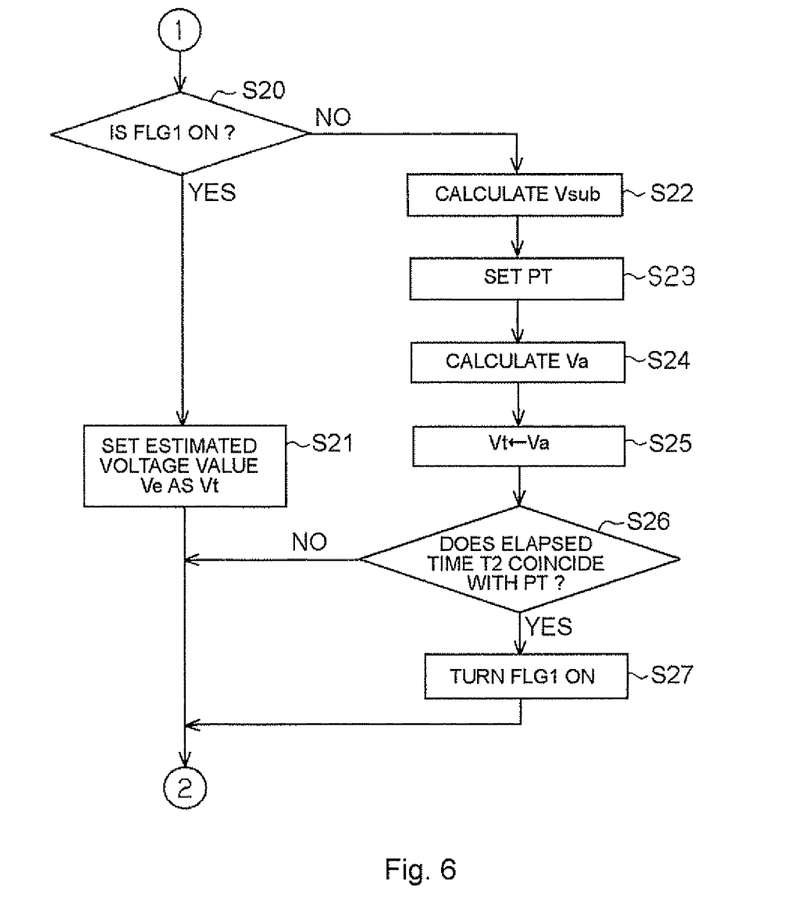

Next, among various control process routines executed by the ECU 11 according to the present embodiment, a rotational speed acquisition process routine for acquiring the rotational speed ω of the motor 12 will be described with reference to the flowcharts shown in FIG. 5 and FIG. 6.

The rotational speed acquisition process routine is executed at predetermined intervals while an ignition switch (not shown) of the vehicle is kept on. In the rotational speed acquisition process routine, in step S10, the ECU 11 acquires the target current value It detected at this timing. In step S11, the ECU 11 determines whether the target current value It acquired in step S10 is zero. When the target current value It is zero ("YES" in step S10), the ECU 11 proceeds to step S12. On the other hand, when the target current value It is not zero ("NO" in step S10), the ECU 11 proceeds to step S20 (FIG. 6), which will be described later.

In step S12, the ECU 11 determines whether a target value flag FLG1 is on. The target value flag FLG1 is turned off when the target current value It is zero; whereas the target value flag FLG1 is turned on when the target current value It is a value other than zero. When the target value flag FLG1 is off ("NO" in step S12), the ECU 11 sets the detected voltage value Vd, detected at this timing, as the inter-terminal voltage Vt because the target current value It is kept at zero (step S13). After that, the ECU 11 proceeds to step S28, which will be described later.

On the other hand, when the target value flag FLG1 is on ("YES" in step S12), the ECU 11 proceeds to step S14 because the target current value It is changed from a value other than zero to zero. Then, in step S14, the ECU 11 calculates the difference Vsub between the estimated voltage value Ve calculated at the previous timing and the detected voltage value Vd detected at the current timing. Subsequently, in step S15, the ECU 11 sets the adjustment time PT such that the larger the difference Vsub calculated in step S14 is, the longer the adjustment time PT is (see FIG. 3).

In step S16, the ECU 11 calculates an adjusted voltage value Va based on an elapsed time T1 from the time when the target current value It is changed from a value other than zero to zero and the adjustment time PT set in step S15. For example, the ECU 11 (voltage adjusting unit 53) calculates the adjusted voltage value Va according to Equation 7 indicated below.

$$Va=Vd+(PT-T1)/PT \cdot Vsub \qquad \text{Equation 7}$$

The ECU 11 sets the adjusted voltage value Va, calculated in step S16, as the inter-terminal voltage Vt (step S17), and determines whether the elapsed time T1 coincides with the adjustment time PT (step S18). When the elapsed time T1 does not coincide with the adjustment time PT ("NO" in step S18), the ECU 11 proceeds to step S28, which will be described later. On the other hand, when the elapsed time T1 coincides with the adjustment time PT ("YES" in step S18), the ECU 11 turns the target value flag FLG1 off (step S19), and proceeds to step S28, which will be described later.

On the other hand, when a negative determination is made in step S11 ("NO" in step S11), the ECU 11 determines in step S20 whether the target value flag FLG1 is on. When the target value flag FLG1 is on ("YES" in step S20), the ECU 11 sets the estimated voltage value Ve, calculated at this timing, as the inter-terminal voltage Vt because the target current value It is kept at a value other than zero (step S21). After that, the ECU 11 proceeds to step S28, which will be described later.

On the other hand, when the target value flag FLG1 is off ("NO" in step S20), the ECU 11 proceeds to step S22 because the target current value It is changed from zero to a value other than zero. Then, in step S22, the ECU 11 calculates the difference Vsub between the detected voltage value Vd detected at the previous timing and the estimated voltage value Ve calculated at the current timing. In step S23, the ECU 11 sets the adjustment time PT such that the larger the difference Vsub calculated in step S14 is, the longer the adjustment time PT is.

In step S24, the ECU 11 calculates an adjusted voltage value Va based on an elapsed time T2 from the time when the target current value It is changed from zero to a value other than zero and the adjustment time PT set in step S23. For example, the ECU 11 (voltage adjusting unit 53) calculates the adjusted voltage value Va according to Equation 8 indicated below.

$$Va=Ve+(PT-T2)/PT \cdot Vsub \qquad \text{Equation 8}$$

The ECU 11 sets the adjusted voltage value Va calculated in step S24 as the inter-terminal voltage Vt (step S25), and determines whether the elapsed time T2 coincides with the adjustment time PT (step S26). When the elapsed time T2 is shorter than the adjustment time PT ("NO" in step S26), the ECU 11 proceeds to step S28, which will be described later. On the other hand, when the elapsed time T2 coincides with the adjustment time PT ("YES" in step S26), the ECU 11 turns the target value flag FLG1 on (step S27), and proceeds to step S28.

In step S28, the ECU 11 substitutes the inter-terminal voltage Vt set in one of the steps S13, S17, S21 and S25 and the detected current value Ie detected at this timing into Equations 2 to 6 indicated above to calculate an induced voltage E. In step S29, the ECU 11 substitutes the induced voltage E calculated in step S28 into Equation 1 indicated above to calculate the rotational speed ω of the motor 12 and, after that, ends the rotational speed acquisition process routine.

Next, the operation at the time when the induced voltage E generated at the motor 12 is calculated will be described with the emphasis on the operation at the time when an affirmative change determination is made. When the target current value It is a value other than zero, the estimated voltage value Ve that is higher in resolution than the detected voltage value Vd is input into the induced voltage observer 38. Then, the induced voltage E generated at the motor 12 is calculated on the basis of the estimated voltage value Ve and the detected current value Ie, and the rotational speed ω of the motor 12 is calculated on the basis of the induced voltage E.

However, for example, when the steering torque τ detected by the torque sensor 14 becomes zero and, therefore, the target current value It becomes zero, the duty ratio D of the drive signal SD input into the motor 12 is set to zero. In this case, it is not possible to calculate the estimated voltage value Ve. Even under a situation where the target current value It is zero as described above, when a driver steers the steering wheel 2, an induced voltage corresponding to a steering amount is generated at the motor 12. In this case, an actual inter-terminal voltage of the motor 12 is a value other than zero. That is, when the target current value It is zero, the estimated voltage value Ve may indicate a value that is significantly different from an actual inter-terminal voltage. Therefore, when the target current value It is zero, the estimated voltage value Ve should not be used to calculate the induced voltage E.

Therefore, in the present embodiment, when the target current value It is zero, a value based on the detected voltage value Vd that is the detected value of the inter-terminal voltage is input into the induced voltage observer 38, and the induced voltage E is calculated with the use of the value. The detected voltage value Vd has a disadvantage that the detected voltage value Vd is lower in resolution than the estimated voltage value Ve; whereas the detected voltage value Vd has an advantage that the detected voltage value Vd is detectable irrespective of the magnitude of the target current value It. Therefore, in the ECU 11 according to the present embodiment, the induced voltage E is calculated irrespective of the magnitude of the target current value It.

In addition, immediately after the target current value It becomes zero, the inter-terminal voltage Vt is adjusted so as to be gradually brought from the estimated voltage value Ve calculated immediately before the target current value It becomes zero, closer to the detected voltage value Vd detected after the target current value It becomes zero (see FIG. 3). Therefore, an abrupt change in the induced voltage E due to switching of a voltage value used to calculate the induced voltage E is suppressed, and, consequently, an abrupt change in the rotational speed ω of the motor 12 is suppressed. Therefore, an abrupt change in the controlled variable of steering control using the calculated rotational speed ω is suppressed, and steering feel of the steering wheel 2, felt by the driver, improves.

After that, when the inter-terminal voltage Vt input into the induced voltage observer 38 coincides with the detected voltage value Vd, the induced voltage E generated at the motor 12 is calculated with the use of the detected voltage value Vd in the induced voltage observer 38 while the target current value It is kept at zero. In addition, in the rotational speed calculation unit 39, the rotational speed ω of the motor 12 is calculated on the basis of the induced voltage E calculated in the induced voltage observer 38.

In this state, for example, the steering torque τ detected by the torque sensor 14 increases and, therefore, the target current value It becomes a value other than zero, the duty ratio D of the drive signal SD input into the motor 12 becomes a value other than zero. Then, it is possible to calculate the estimated voltage value Ve. Therefore, a value based on the estimated voltage value Ve that is higher in resolution than the detected voltage value Vd is input into the induced voltage observer 38. As a result, the induced voltage E is calculated with the use of the value based on the estimated voltage value Ve.

In addition, immediately after the target current value It is changed from zero to a value other than zero, the inter-terminal voltage Vt is adjusted to be gradually brought from the detected voltage value Vd detected immediately before the target current value It becomes a value other than zero, closer to the estimated voltage value Ve calculated after the target current value It becomes a value other than zero. Therefore, an abrupt change in the induced voltage E due to switching of a voltage value used to calculate the induced voltage E is suppressed, and, consequently, an abrupt change in the rotational speed ω of the motor 12 is suppressed. Therefore, an abrupt change in the controlled variable of steering control with the use of the calculated rotational speed ω is suppressed, and steering feel of the steering wheel 2, felt by the driver, improves.

As described above, according to the present embodiment, the following advantageous effects are obtained.

(1) It is determined which of the detected voltage value Vd and the estimated voltage value Ve is used to calculate the induced voltage E, on the basis of the magnitude of the target current value It. Therefore, even when the motor 12 is a brushed motor, the estimated voltage value Ve is utilized as the inter-terminal voltage Vt as far as possible. Therefore, it is possible to improve the accuracy of calculation of the induced voltage E.

(2) On the other hand, when the target current value It is zero, it is not possible to calculate the estimated voltage value Ve. Therefore, the induced voltage E is calculated using a value based on the detected voltage value Vd as the inter-terminal voltage Vt. Therefore, in the present embodiment, it is possible to calculate the induced voltage E irrespective of the magnitude of the target current value It.

(3) When the target current value It is changed from zero to a value other than zero, the inter-terminal voltage Vt is adjusted so as to be brought from the detected voltage value Vd detected before the target current value It is changed to a value other than zero, closer to the estimated voltage value Ve calculated after the change. On the other hand, when the target current value It is changed from a value other than zero to zero, the inter-terminal voltage Vt is adjusted so as to be brought from the estimated voltage value Ve calculated before the target current value It is changed to zero, closer to the detected voltage value Vd detected after the change. As a result, it is possible to suppress an abrupt change in the result of calculation of the induced voltage E due to a change in the target current value It. Therefore, it is possible to suppress an unnatural change in the controlled variable in motor control based on the calculated induced voltage E.

(4) When an affirmative change determination is made, the difference Vsub between a first voltage value (for example, detected voltage value Vd) acquired before an affirmative change determination is made and a second voltage value (for example, estimated voltage value Ve) acquired at the time when an affirmative change determination is made is calculated. In addition, the larger the difference Vsub is, the longer period the adjustment time PT is set to. Therefore, the inter-terminal voltage Vt is adjusted during the adjustment time PT that starts when an affirmative change determination is made, so as to be gradually brought from the first voltage value closer to the second voltage value. Therefore, it is possible to suppress an abrupt change in the induced voltage E due to a change in the target current value It.

(5) Further, in the present embodiment, the rotational speed ω of the motor 12 is calculated on the basis of the calculated induced voltage E. That is, it is possible to calculate the rotational speed ω irrespective of the magnitude of the target current value It, and, consequently, it is possible to appropriately execute motor control using the rotational speed ω.

(6) In the electric power steering system 1, when it is not necessary to assist the driver in performing a steering operation of the steering wheel 2 with the use of the motor 12, the target current value It for the motor 12 is set to zero. In such a case as well, the rotor (not shown) of the motor 12 rotates through a driver's steering operation, and the induced voltage E is generated. In the present embodiment, when it is not necessary to assist the driver in performing a steering operation with the use of the motor 12, with the use of the detected voltage value Vd, it is possible to calculate the induced voltage E generated at the motor 12 due to the driver's steering operation of the steering wheel 2. In addition, when driver's steering operation is assisted by the motor 12, the estimated voltage value Ve is utilized. Therefore, it is possible to accurately calculate the induced voltage E. Therefore, it is possible to execute steering control with the use of the induced voltage E in the electric power steering system 1 irrespective of the magnitude of the target current value It.

Note that the embodiment described above may be modified into the following alternative embodiments.

In the embodiment, on the basis of the difference Vsub calculated when an affirmative change determination is made, an amount of change in the inter-terminal voltage per unit time may be set to a larger value when the difference Vsub is large than when the difference Vsub is small. In this case, the adjustment time PT may be a constant value irrespective of the magnitude of the difference Vsub.

In the embodiment, the input voltage setting unit 37 may output the detected voltage value Vd as the inter-terminal voltage Vt when the target current value It is zero, and may output the estimated voltage value Ve as the inter-terminal voltage Vt when the target current value It is a value other than zero.

In this case, the ECU 11 may further include a filter unit as a functional unit. The filter unit subjects the inter-terminal voltage Vt received from the input voltage setting unit 37 to filtering, and then outputs the filtered voltage value to the induced voltage observer 38.

The motor control unit according to the invention may be included in an electric power steering system that has a sensor, such as a resolver, for detecting the rotational speed of a motor. In this case, when a failure of a sensor is detected, the ECU 11 may execute the rotational speed acquisition process routine shown in FIG. 5 and FIG. 6 to calculate the rotational speed ω of the motor 12.

The electric power steering system according to the invention may be implemented as a pinion assist-type or rack assist-type electric power steering system. The rack assist type may be a so-called rack parallel type in which an output shaft of a motor is arranged parallel to a rack shaft, a rack cross type in which an output shaft of a motor is arranged so as to obliquely intersect with a rack shaft, or the like.

The motor control unit according to the invention may be provided in another electronic device (for example, electric power-assisted bicycle) other than the electric power steering system 1 as long as an electronic device includes a brushed motor.

What is claimed is:

1. A motor control unit, characterized by comprising:
    target value setting means for setting a target value of current that is passed through a motor;
    voltage detecting means for detecting an inter-terminal voltage of the motor as a detected voltage value;
    voltage calculation means for calculating an estimated voltage value as an inter-terminal voltage of the motor based on a power supply voltage of a power supply source for the motor and a duty cycle; and
    induced voltage calculation means for calculating an induced voltage generated at the motor using a voltage value based on the estimated voltage value calculated by the voltage calculation means when the target value of current is set to a value other than zero by the target value setting means, and for calculating the induced voltage generated at the motor using a voltage value based on the detected voltage value detected by the voltage detecting means when the target value of current is set to zero,
    wherein the calculated induced voltage is output as the inter-terminal voltage.

2. The motor control unit according to claim 1, further comprising:
    voltage adjusting means for, when the target value of current is changed from zero to a value other than zero or changed from a value other than zero to zero by the target value setting means, bringing a voltage value that is input into the induced voltage calculation means from one of the detected voltage value and the estimated voltage value, which is acquired before the target value of current is changed, closer to the other one of the detected voltage value and the estimated voltage value, which is acquired after the target value of current is changed,
    wherein the induced voltage calculation means calculates the induced voltage generated at the motor using the voltage value adjusted by the voltage adjusting means.

3. An electric power steering system, characterized by comprising the motor control unit according to claim 1.

4. The motor control unit according to claim 2, wherein:
    the voltage adjusting means obtains a difference between one of the detected voltage value and the estimated voltage value, which is acquired before the target value of current is changed, and the other one of the detected voltage value and the estimated voltage value, which is acquired after the target value of current is changed;
    the voltage adjusting means sets an adjustment time such that the adjustment time is longer when the difference is large than when the difference is small; and
    the voltage adjusting means gradually changes the voltage that is input into the induced voltage calculation means such that the voltage value that is input into the induced voltage calculation means becomes the one of the estimated voltage value and the detected voltage value, which is acquired after the target value of current is changed, after a lapse of the adjustment time from when the target value of current is changed.

* * * * *